(12) United States Patent
Korniyenko et al.

(10) Patent No.: US 7,387,022 B1
(45) Date of Patent: Jun. 17, 2008

(54) THERMAL MASS FLOW TRANSDUCER INCLUDING PWM-TYPE HEATER CURRENT DRIVER

(75) Inventors: Oleg Korniyenko, Burlington (CA); Boris Yankovskiy, Mississauga (CA); Gabriel Stoianov, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/743,462

(22) Filed: May 2, 2007

(51) Int. Cl.
*G01F 1/68* (2006.01)

(52) U.S. Cl. .................................. 73/204.11

(58) Field of Classification Search ..............
73/204.11–204.19, 204.23–204.27
See application file for complete search history.

(56) References Cited

U.S. PATENT DOCUMENTS

| | | |
|---|---|---|
| 3,603,147 A | 9/1971 | Dorman |
| 3,905,230 A | 9/1975 | Calvet et al. |
| 4,043,196 A | 8/1977 | Trageser |
| 4,334,186 A | 6/1982 | Sasayama et al. |
| 4,335,605 A | 6/1982 | Boyd |
| 4,565,091 A | 1/1986 | Ito et al. |
| 4,649,745 A | 3/1987 | Kondo et al. |
| 4,753,111 A | 6/1988 | Caron et al. |
| 4,872,339 A | 10/1989 | Gerhard et al. |
| 4,884,215 A | 11/1989 | Zboralski et al. |
| 4,934,188 A | 6/1990 | Tanimoto et al. |
| 4,934,189 A | 6/1990 | Tanimoto et al. |
| 5,311,762 A * | 5/1994 | Drexel .................... 73/1.34 |
| 5,339,687 A | 8/1994 | Gimson et al. |
| 5,533,412 A * | 7/1996 | Jerman et al. .......... 73/861.95 |
| 5,654,507 A | 8/1997 | Hicks et al. |
| 5,783,757 A | 7/1998 | Le Van Suu |
| 6,032,526 A * | 3/2000 | Akamatsu ............... 73/204.17 |
| 6,453,739 B1 | 9/2002 | Saikalis et al. |
| 6,658,931 B1 | 12/2003 | Plumb et al. |
| 6,973,826 B2 | 12/2005 | Matsumoto et al. |
| 7,058,532 B1 | 6/2006 | Yamagishi et al. |
| 7,140,263 B2 | 11/2006 | Beversdorf |
| 2003/0178016 A1 | 9/2003 | Nebiyeloul-Kifle et al. |
| 2006/0213263 A1 | 9/2006 | Kawanishi et al. |

* cited by examiner

*Primary Examiner*—Jewel Thompson
(74) *Attorney, Agent, or Firm*—Ingrassia Fisher & Lorenz

(57) ABSTRACT

A thermal mass flow transducer includes first and second constant current sources, a first temperature sensitive element, a second temperature sensitive element, a heater element, and a control circuit. The control circuit is coupled to the heater element and is further coupled to receive temperature signals from the first and second temperature sensitive element. The control circuit is responsive to the temperature signals to determine a temperature difference between the first and second temperature sensitive elements, to generate a pulse width modulation (PWM) current based on the determined temperature difference, and to supply the current to the heater element at a current magnitude sufficient to maintain the temperature difference at a predetermined value.

20 Claims, 2 Drawing Sheets

THERMAL MASS FLOW TRANSDUCER INCLUDING PWM-TYPE HEATER CURRENT DRIVER

TECHNICAL FIELD

The present invention generally relates to fluid flow transducers and, more particularly, to a thermal mass flow transducer heater control circuit current driver.

BACKGROUND

Fluid flow sensing and control systems are included in various systems, devices, and environments. For example, many aircraft rely on accurate airflow sensing and control for various performance and environmental functions, such as engine starting, equipment cooling, and cockpit and cabin environmental control. No matter the particular end-use, typical flow sensing and control systems include one or more flow transducers to sense the mass flow rate of the fluid being controlled, and supply a signal representative of the sensed flow to a control law. The control law may then command one or more flow control devices, such as one or more valves, to a appropriate position to achieve a desired fluid flow rate.

One particular type of flow transducer that has been and continues to be used is a thermal mass flow transducer. A typical thermal mass flow transducer includes a pair of temperature sensing elements, a heater, and a control circuit. One of the temperature sensing elements is heated by the heater, whereas the other is not. The control circuit is coupled to the temperature sensing elements and the heater, and supplies current to the heater to maintain a constant temperature difference between the temperature sensing elements. The heater current needed to maintain the constant temperature difference is also representative of the fluid mass flow rate. To generate and supply the heater current, the control circuit typically includes a DC-type current driver, which is usually a power transistor-based driver.

The thermal mass flow transducer described above works reasonably well, but does exhibit certain drawbacks. For example, of the energy dissipated by the thermal mass flow transducer, about 40-70% is by the DC-type current driver, and only about 30-60% is by the heater. The relatively large energy dissipation by the DC-type current driver results in a significant energy waste. Moreover, this energy is dissipated in the form of heat, which may be conducted to the non-heated temperature sensing element, resulting in reduced flow sensing accuracy.

Hence, there is a need for a thermal mass flow transducer that dissipates relatively low amounts of wasted energy and/or exhibits increased accuracy, as compared to presently known transducers. The present invention addresses one or more of these needs.

BRIEF SUMMARY

In one exemplary embodiment, a thermal mass flow transducer includes first and second constant current sources, a first temperature sensitive element, a second temperature sensitive element, a heater element, and a control circuit. The first and second constant current sources are each operable to supply a constant current. The first temperature sensitive element is coupled to receive the constant current supplied from the first constant current source and is configured, upon receipt thereof, to generate a first temperature signal representative of its temperature. The second temperature sensitive element is coupled to receive the constant current supplied from the second constant current source and is configured, upon receipt thereof, to generate a second temperature signal representative of its temperature. The heater element is in thermal communication with the first temperature sensitive element and is thermally isolated from the second temperature sensitive element. The heater element is further coupled to receive a heater element current and, in response thereto, to generate heat. The control circuit is coupled to the heater element and is further coupled to receive the first and second temperature signals. The control circuit is operable, in response to the first and second temperature signals, to determine a temperature difference between at least the first and second temperature sensitive elements, generate a pulse width modulation (PWM) current based on the determined temperature difference, and supply the heater current to the heater element at a current magnitude sufficient to maintain the temperature difference at a predetermined value.

Other desirable features and characteristics of the thermal mass flow transducer will become apparent from the subsequent detailed description and the appended claims, taken in conjunction with the accompanying drawings and this background.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
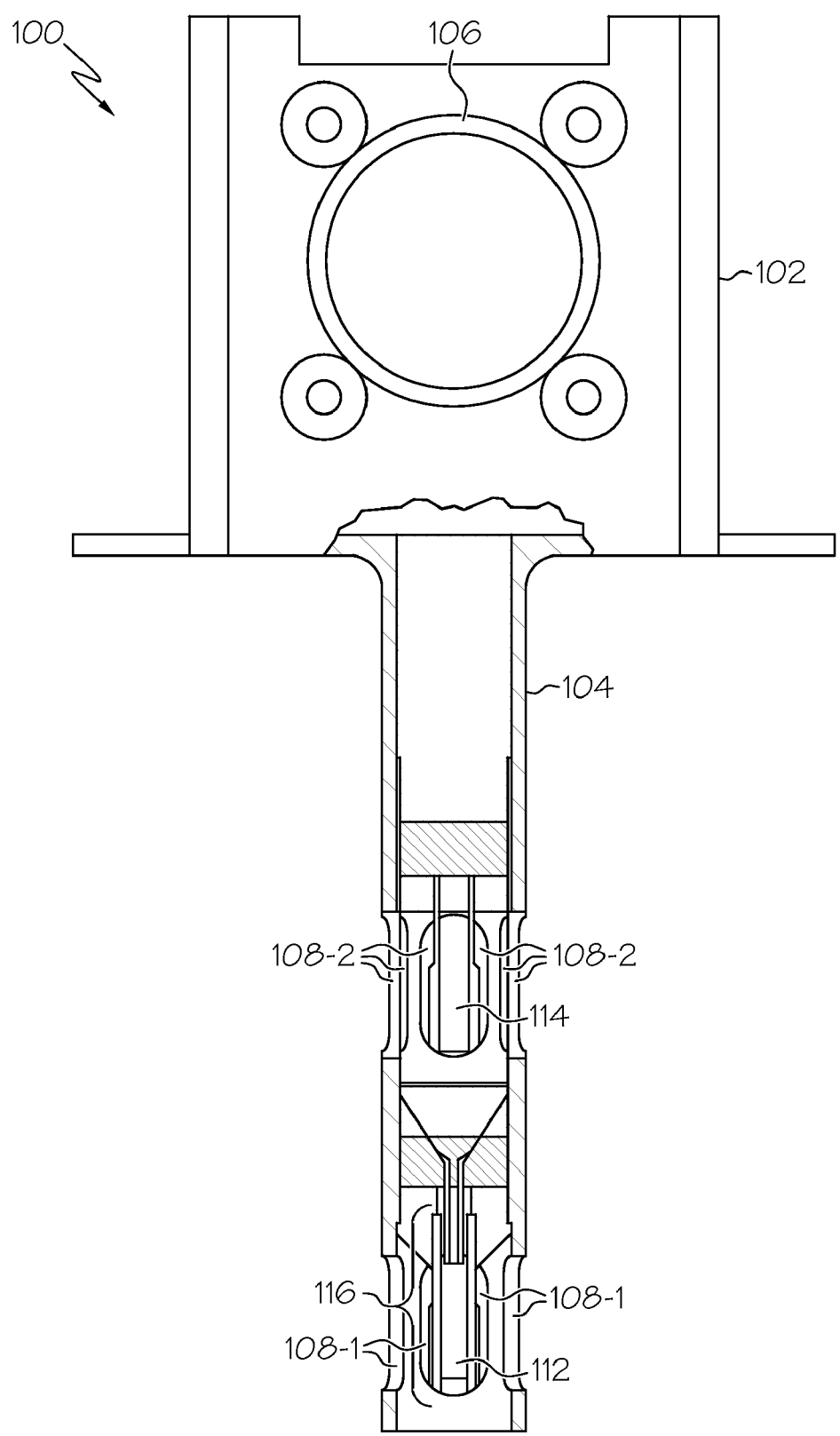
FIG. 1 is a partial cross section view of an exemplary physical embodiment of a thermal mass flow transducer.

An exemplary physical implementation of a thermal mass flow transducer 100 is depicted, in partial cross section, in FIG. 1, and includes a housing 102 and a probe 104. The housing 102 is coupled to the probe 104 and is preferably configured to mount a fluid flow duct. The housing 102 preferably houses various circuitry, such as the circuitry described further below, and includes a connector 106 that is preferably coupled to the circuitry via non-illustrated leads. Various other non-illustrated leads extend through a non-illustrated opening in the housing 102 and into the probe 104.

The probe 104 extends from the housing in cantilever fashion, and has first and second sets of flow openings 108-1, 108-2 formed therein. A first temperature sensitive element 112, a second temperature sensitive element 114, and a heater element 116 are each mounted within the probe 104. The first temperature sensitive element 112 and heater element 116 are disposed adjacent the first set of flow openings 108-1, and the second temperature sensitive element 114 is disposed adjacent the second set of flow openings 108-2. Thus, when the probe 104 is extended into a fluid stream, fluid may flow past the first temperature sensitive element 112 and heater element 116 via the first set of flow openings 108-1, and past the second temperature sensitive element 114 via the second set of flow openings 108-2. The first temperature sensitive element 112 and heater element 116 are disposed such that the heater element 116 is in thermal communication with the first temperature sensitive element 112. Moreover, the second temperature sensitive element 114 is disposed such that it is thermally isolated from the heater element 116. With this configuration, heat generated by the heater element 116 is at least partially transferred to the first temperature sensitive element 112, but not to the second temperature sensitive element 114.

The first and second temperature sensitive elements 112, 114 may be implemented using any one of numerous types of devices, such as resistance temperature detectors (RTDs), thermocouples, thermistors, or various semiconductor devices. In the depicted embodiment, however, each is implemented using a platinum RTD. As is generally known, platinum RTDs exhibit a generally positive temperature coefficient of resistivity. In other words, the resistance of the platinum RTD increases as its temperature increases. It will be appreciated that the temperature sensitive elements 112, 114 may also each be implemented using one or a plurality of devices.

The heater element 116 is preferably implemented as an electrical resistance heater that, when energized with electrical current, generates heat. As noted above, the heater element 116 is disposed in thermal communication with the first temperature sensitive element 112. Most preferably, the heater element 116 is disposed adjacent to, and in relatively close proximity with, the first temperature sensitive element 112. In any case, and as was also noted above, because it is in thermal communication with the first temperature sensitive element 112 at least a portion of the heat generated by the heater element 116 is transferred to the first temperature sensitive element 112, thereby affecting the element of the first temperature sensitive element 112.

During operation of the transducer 100, the first and second temperature sensitive elements 112, 114 are each supplied with substantially constant magnitude electrical current. It will thus be appreciated that the voltage drop across the first and second temperature sensitive elements 112, 114 will vary with the associated element temperatures. The heater element 116 is energized with electrical current that may vary in magnitude. More specifically, the electrical current supplied to the heater element 116 is of a magnitude such that the heater element 116 will heat the first temperature sensitive element 112 in a manner that the temperature difference between the first and second temperature sensitive elements 112, 114 is maintained at a constant predetermined value. To implement this functionality, the transducer 100 further includes the previously mentioned circuitry that is not illustrated in FIG. 1. An exemplary embodiment of this circuitry 200 is, however, depicted in FIG. 2, and will be described in more detail. Before doing so, however, it is noted that the thermal mass flow transducer 100 depicted in FIG. 1 is merely exemplary of one of numerous configurations.

Figure 2:
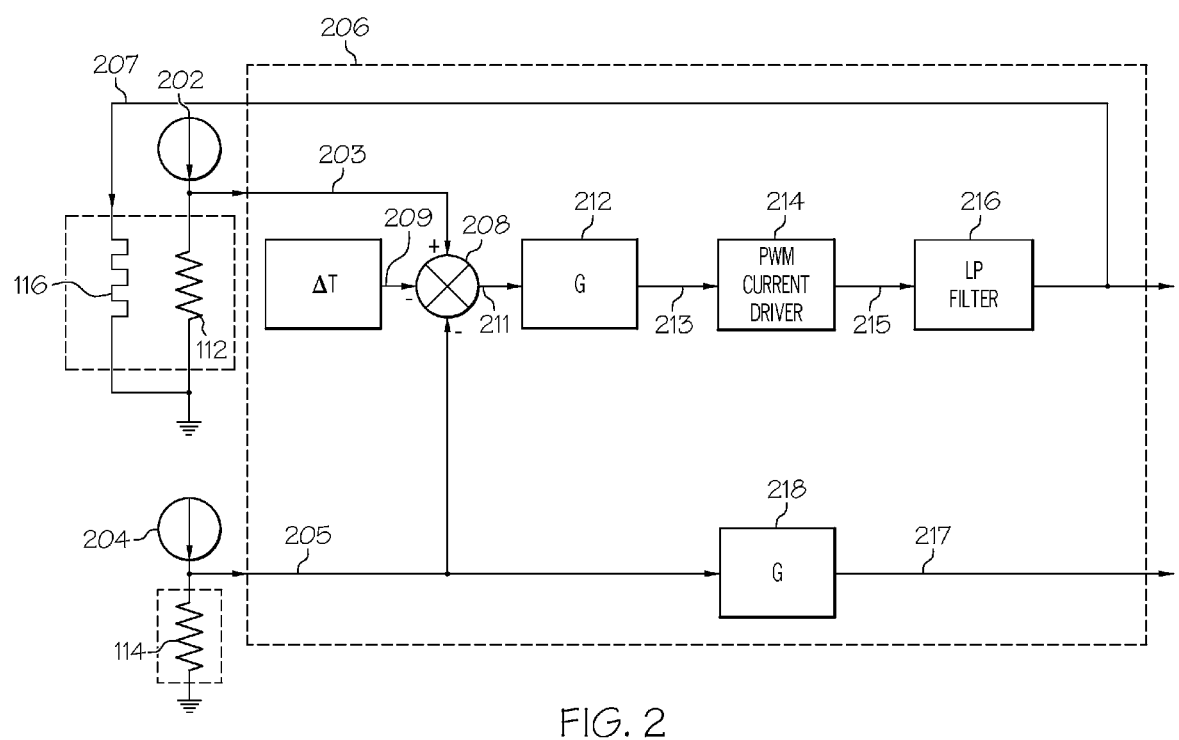
FIG. 2 is a functional block diagram of the exemplary thermal mass flow transducer of FIG. 1.

Turning now to FIG. 2, it is seen that the circuitry 200 includes first and second precision current sources 202, 204 and a control circuit 206. The first and second precision current sources 202, 204 supply substantially constant magnitude current, as mentioned above, to the first and second temperature sensitive elements 112, 114, respectively. The precision current sources 202, 204 may be implemented using high precision operational amplifiers. The first and second temperature sensitive elements 112, 114, upon being energized with the constant magnitude currents, generate first and second temperature signals 203, 205, respectively, representative of the first and second temperature sensitive element temperatures ($T_{112}$, $T_{114}$), respectively. The first and second temperature signals 203, 205 are supplied to the control circuit 206.

The control circuit 206 is coupled to receive the first and second temperature signals 203, 205, and to supply heater current 207 to the heater element 116 at the appropriate current magnitude. To do so, the control circuit 206 is configured to determine the temperature difference between at least the first and second temperature sensitive elements 112, 114. The control circuit 206 then generates a pulse width modulation (PWM) current based on the determined temperature difference, and supplies the heater current 207 to the heater element 116 at a current magnitude sufficient to maintain the temperature difference between at a predetermined value. It will be appreciated that the control circuit 206 may be variously configured to implement this functionality, but in the depicted embodiment the control circuit 206 is configured to include a comparator 208, a gain amplifier 212, a PWM current driver 214, and a filter 216. Each of these functional blocks will now be described in more detail.

The comparator 208 is coupled to receive the first and second temperature signals 203, 205, and is additionally coupled to receive a temperature difference signal 209. The temperature difference signal 209 is representative of the predetermined temperature difference ($\Delta T$) that is to be maintained between the first and second temperature sensitive elements 112, 114. The comparator 216, upon receipt of these signals 203, 205, 209, generates an error signal 211 representative of the following:

$$\text{Error} = T_{112} - T_{114} - \Delta T.$$

Thus, when the temperature difference between the first and second temperature sensitive elements 112, 114 is equal to the predetermined temperature difference ($\Delta T$), the error will be a zero value; when the temperature $T_{112}$ of the first temperature sensitive element 112 exceeds the temperature $T_{114}$ of the second temperature sensitive element 114 by more than the predetermined temperature difference ($\Delta T$), then the error will be a positive value; and when the temperature $T_{112}$ of the first temperature sensitive element 112 exceeds the temperature $T_{114}$ of the second temperature sensitive element 114 by less than the predetermined temperature difference ($\Delta T$), then the error will be a negative value.

The gain amplifier 212 is coupled to receive the error signal 211 and, in response thereto, supplies a current command signal 213. The current command signal 213 preferably represents a heater current rate-of-change and resultant heater current. Preferably, a dynamic operational amplifier circuit is used to implement the gain amplifier 212. No matter its particular implementation, the gain amplifier 212 supplies the current command signal 213 to the PWM current driver 214.

Before proceeding further it is noted that the second temperature signal 205, in addition to being supplied to the comparator 208, may also be supplied to a second gain amplifier 218. This second gain amplifier 218, if included, amplifies and conditions the second temperature signal 205, and supplies a signal 217 representative of the temperature of the second temperature sensitive element ($T_{114}$) to non-illustrated external circuits and/or systems.

Returning once again to the description of the control circuit 206, the PWM current driver 214 is coupled to receive the current command signal 213 from the gain amplifier 212. The PWM current driver 214, in response to the current command signal 213, generates the above-mentioned PWM current 215, and supplies it to the low-pass filter 216. The low-pass filter 216 filters the PWM current 215. The filtered PWM current is the heater current 207 that is supplied to the heater element 116. It will be appreciated that the PWM current driver 214 is preferably implemented with a current limiting feature to prevent the heater element 116 from overheating if flow rate past the temperature sensitive elements 112, 114 is relatively low or non-existent.

The heater current 207 that is supplied to the heater element 116 is representative of the fluid flow rate past the transducer 100. As such, the heater current 207, or a signal representative thereof, may be used to drive non-illustrated meters directly or can be used in a non-illustrated controller of a larger system, such as various aircraft ducts, HVAC, heavy industrial air conditioning systems, and other similar systems.

The thermal mass flow transducer 100 described herein includes a PWM-type current driver 214, which provides improved power efficiency over present thermal mass flow meters. For example, for a particular set of operating conditions (e.g., heater driver current, a 28 Vdc power supply, and a 20-ohm heater element resistance), the power efficiency of a presently known thermal mass flow transducer utilizing a DC current driver is in the range of about 7.9% to about 17.1%. Under these same conditions, the power efficiency of the PWM driver 216 is much higher, and varies between about 84% and about 92% in some embodiments, and between about 94.0% and 97.2% in other embodiments. This rather significant improvement in power efficiency results in better flow measurement accuracy.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thermal mass flow transducer, comprising:
    first and second constant current sources each operable to supply a constant current;
    a first temperature sensitive element coupled to receive the constant current supplied from the first constant current source and configured, upon receipt thereof, to generate a first temperature signal representative of its temperature;
    a second temperature sensitive element coupled to receive the constant current supplied from the second constant current source and configured, upon receipt thereof, to generate a second temperature signal representative of its temperature;
    a heater element in thermal communication with the first temperature sensitive element and thermally isolated from the second temperature sensitive element, the heater element coupled to receive a heater current and, in response thereto, to generate heat; and
    a control circuit coupled to the heater element and further coupled to receive the first and second temperature signals, the control circuit operable, in response to the first and second temperature signals, to:
        (i) determine a temperature difference between at least the first and second temperature sensitive elements,
        (ii) generate a pulse width modulation (PWM) current based on the determined temperature difference, and
        (iii) supply the heater current to the heater element at a current magnitude sufficient to maintain the temperature difference at a predetermined value.

2. The transducer of claim 1, wherein the control circuit comprises:
    a PWM current driver coupled to receive a current command signal and operable, in response thereto, to generate the PWM current.

3. The transducer of claim 2, wherein the control circuit comprises:
    a low-pass filter coupled to receive the PWM current and supply the heater current to the heater element.

4. The transducer of claim 2, wherein the control circuit comprises:
    a comparator coupled to receive the first temperature signal and the second temperature signal and operable to supply an error signal based in part on the determined temperature difference; and
    an amplifier coupled to receive the error signal and operable, in response thereto, to supply the current command signal to the PWM current driver.

5. The transducer of claim 4, wherein:
    the comparator is further coupled to receive a predetermined temperature difference signal representative of the predetermined value; and
    the error signal is based on the determined temperature difference and the predetermined value.

6. The transducer of claim 4, wherein the current command signal represents a heater current rate-of-change and resultant heater current.

7. The transducer of claim 1, further comprising:
    an amplifier coupled to receive the temperature signal and operable, in response thereto, to supply an ambient temperature signal.

8. The transducer of claim 1, wherein the first and second temperature sensitive elements are each platinum element temperature detectors (RTDs).

9. The transducer of claim 1, wherein the heater current is representative of a fluid flow rate past the first and second temperature sensitive elements.

10. The transducer of claim 1, further comprising:
    a housing surrounding at least a portion of the control circuit; and
    a probe extending, in cantilever fashion, from the housing, the probe having the first temperature sensitive element, the second temperature sensitive element, and the heater element disposed therein.

11. A thermal mass flow transducer assembly, comprising:
    a housing;
    a probe extending, in cantilever fashion, from the housing;
    first and second constant current sources disposed within the housing, each constant current source operable to supply a constant current;
    a first temperature sensitive element disposed within the probe and coupled to receive the constant current supplied from the first constant current source, the first temperature sensitive element configured, upon receipt of the constant current, to generate a first temperature signal representative of its temperature;

a second temperature sensitive element disposed within the probe and coupled to receive the constant current supplied from the second constant current source, the second temperature sensitive element configured, upon receipt of the constant current, to generate a second temperature signal representative of its temperature;

a heater element in thermal communication with the first temperature sensitive element and thermally isolated from the second temperature sensitive element, the heater element coupled to receive a heater current and, in response thereto, to generate heat; and a control circuit disposed at least partially within the housing, the control circuit coupled to the heater element and further coupled to receive the first and second temperature signals, the control circuit operable, in response to the first and second temperature signals, to:
 (i) determine a temperature difference between at least the first and second temperature sensitive elements,
 (ii) generate a pulse width modulation (PWM) current based on the determined temperature difference, and
 (iii) supply the heater current to the heater element at a current magnitude sufficient to maintain the temperature difference at a predetermined value.

12. The transducer of claim 11, wherein the control circuit comprises:
a PWM current driver coupled to receive a current command signal and operable, in response thereto, to generate the PWM current.

13. The transducer of claim 12, wherein the control circuit comprises:
a low-pass filter coupled to receive the PWM current and supply the heater current to the heater element.

14. The transducer of claim 12, wherein the control circuit comprises:
a comparator coupled to receive the first temperature signal and the second temperature signal and operable to supply an error signal based in part on the determined temperature difference; and
an amplifier coupled to receive the error signal and operable, in response thereto, to supply the current command signal to the PWM current driver.

15. The transducer of claim 14, wherein:
the comparator is further coupled to receive a predetermined temperature difference signal representative of the predetermined value; and
the error signal is based on the determined temperature difference and the predetermined value.

16. The transducer of claim 14, wherein the current command signal represents a heater current rate-of-change and resultant heater current.

17. The transducer of claim 11, further comprising:
an amplifier coupled to receive the temperature signal and operable, in response thereto, to supply an ambient temperature signal.

18. The transducer of claim 11, wherein the first and second temperature sensitive elements are each platinum element temperature detectors (RTDs).

19. The transducer of claim 11, wherein the heater current is representative of a fluid flow rate past the first and second temperature sensitive elements.

20. A thermal mass flow transducer assembly, comprising:
a housing;
a probe extending, in cantilever fashion, from the housing;
first and second constant current sources disposed within the housing, each constant current source operable to supply a constant current;
a first temperature sensitive element disposed within the probe and coupled to receive the constant current supplied from the first constant current source, the first temperature sensitive element configured, upon receipt of the constant current, to generate a first temperature signal representative of its temperature;
a second temperature sensitive element disposed within the probe and coupled to receive the constant current supplied from the second constant current source, the second temperature sensitive element configured, upon receipt of the constant current, to generate a second temperature signal representative of its temperature;
a heater element in thermal communication with the first temperature sensitive element and thermally isolated from the second temperature sensitive element, the heater element coupled to receive a heater current and, in response thereto, to generate heat; and
a control circuit disposed at least partially within the housing and comprising:
 a comparator coupled to receive the first temperature signal, the second temperature signal, and a temperature difference signal representative of a predetermined temperature difference value, and operable, in response thereto, to supply an error signal,
 an amplifier coupled to receive the error signal and operable, in response thereto, to supply a current command signal,
 a PWM current driver coupled to receive the current command signal and operable, in response thereto, to generate the PWM current; and
 a low-pass filter coupled to receive the PWM current and supply the heater current to the heater element at a current magnitude sufficient to maintain the temperature difference at the predetermined temperature difference value.

* * * * *